(12) United States Patent
Brunel

(10) Patent No.: US 7,079,607 B2
(45) Date of Patent: Jul. 18, 2006

(54) MULTI-USER DETECTION METHOD

(75) Inventor: Loic Brunel, Rennes (FR)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 777 days.

(21) Appl. No.: 09/918,477

(22) Filed: Aug. 1, 2001

(65) Prior Publication Data

US 2002/0041644 A1    Apr. 11, 2002

(30) Foreign Application Priority Data

Aug. 29, 2000  (FR) ................................ 00 11250

(51) Int. Cl.
  *H03D 1/04*    (2006.01)
  *H03D 1/06*    (2006.01)
  *H03K 5/01*    (2006.01)
  *H03K 6/04*    (2006.01)
  *H04B 1/10*    (2006.01)

(52) U.S. Cl. .................. 375/346; 375/285; 455/296

(58) Field of Classification Search ........... 375/349, 375/347, 267, 346, 285, 350, 227, 148; 455/63.1, 455/67.13, 278.1, 296
See application file for complete search history.

(56) References Cited

FOREIGN PATENT DOCUMENTS

EP    0 978 951    2/2000

OTHER PUBLICATIONS

M. C. Reed, et al., IEEE Journal on Selected Areas in Communications, vol. 17, No. 12, XP-000920304, pp. 2082-2089, "Iterative Multiuser Detection Using Antenna Arrays and FEC on Multipath Channels", Dec. 1999.
S. Moshavi, IEEE Communications Magazine, vol. 34, No. 10, XP-000694489, pp. 124-136, "Multi-User Detection for DS-CDMA Communications", Oct. 1, 1996.
B. H. Khalaj, IEEE International Conference on Communications (CAT. No. 95CH35749), vol. 3, XP-002168234, pp. 1520-1524, "Spatio-Temporal Channel Estimation Techniques for Multiple Access Spread Spectrum Systems with Antenna Arrays", 1995.

*Primary Examiner*—Jean B. Corrielus
(74) *Attorney, Agent, or Firm*—Oblon, Spivak, McClelland, Maier & Neustadt, P.C.

(57) ABSTRACT

A multi-user detection method eliminating interference between users transmitting modulated data of symbols on a transmission channel, each transmission channel including at least one propagation path arriving at an array of reception antennas in a direction of arrival. Each user (a) estimates the signal transmitted by the user from the antenna signals, effecting estimation of the direction of arrival and characteristics of propagation of each path of the transmission channel from the signals; (b) estimates the data transmitted by the user from the estimation of the signal transmitted; (c) estimates the contribution of the user to the signals received by the different antennas from the estimated data and the estimated direction of arrival and propagation characteristics; and (d) subtracts from the antenna signals the contribution estimated at (c) to obtain cleaned antenna signals, supplied by at least a first sequence, used as antenna signals by at least a second sequence.

17 Claims, 11 Drawing Sheets

MULTI-USER DETECTION METHOD

BACKGROUND OF THE INVENTION

1. Field of the Invention

The present invention concerns in general terms a Multi-User Detection (MUD) method. More precisely, the present invention relates to an iterative method of eliminating interference between users (Multiple Access Interference or MAI). The present invention applies more particularly to mobile telephony in DS-CDMA (Direct Sequence-Code Division Multiple Access) mode, that is to say to mobile telephony using a code distribution access mode with direct sequence spectral spreading.

2. Discussion of the Background

In a DS-CDMA mobile telephony system, the separation of the different users is effected by multiplying each user symbol by a spreading sequence peculiar to it, also referred to for this reason as the user signature, the different signatures ideally being chosen so as to be orthogonal. The spreading sequence frequency (chip rate) being greater than the frequency of the symbols, the signal transmitted by each user is distributed (or spread) in the frequency space. On reception, the separation of the signal of a user is effected by means of a filtering adapted to the corresponding signature. This filtering is also referred to as "de-spreading". The ratio between the band occupied by the spread signal and the band occupied by the information signal is referred to as the spread factor.

The signals employed must have good correlation properties, namely a very pronounced autocorrelation peak and very low intercorrelation values.

The first of these two characteristics enables the received sequence to be synchronised. It is very useful when the transmission channel of a user includes several propagation paths. This is because each path can then be isolated by virtue of a filtering adapted to the signature and to the delay of the path. Advantage can be taken of the propagation diversity within the channel to increase the signal to noise ratio on reception. For this purpose, a bank of adapted filters is used, separating the different paths, and the outputs combined. The most widespread combination is MRC (Maximum Ratio Combining), which consists of multiplying the signal output from each adapted filter by the conjugate of the complex multiplying coefficient introduced by the channel on the path concerned. The resulting filtering operation is a filtering adapted to the equivalent filter of the channel. Because of its structure, the receiver thus formed is referred to as a rake receiver. Naturally, perfect separation of the path takes place only if the autocorrelation is a Dirac. In practice, however, the separation is not complete and leaves a multipath interference which is also referred to as self noise. FIG. 1 depicts schematically a DS-CDMA system with K users. The data of a user k are spread in frequency by the corresponding frequency in the module $100_k$ before being transmitted over a channel $110_k$ including P paths. On reception, for a given user k, the signals being propagated on the different paths p=1 . . . P of the channel are separated by adapted filters $120_{k,1}$ . . . $120_{k,P}$ (only the battery of filters of the user k has been depicted) before being weighted by a set of complex coefficients $C_{k,p}$. The signals thus weighted are summed ($140_k$) and the resulting sum at the output of the rake receiver is subsequently detected in order to provide an estimation of the data of the user k. In the case of a downlink (links from a base station to a mobile terminal) the channels 1 to K are identical whilst they are different in the uplink (links from mobile terminals to the base station). The first case can, from this point of view, be considered to be a particular case of the second.

The second characteristic set out above guarantees a low level of interference between two distinct users. Nevertheless, there too, in practice, the intercorrelation between two signatures is rarely zero. This is particularly the case in a so-called near-far effect situation, where a high-power signal received from a user interferes with the reception of a low-power signal coming from another user. Moreover, when the number of users is high, close to the spread factor, the sum of the interferences of the different users, low if taken in isolation, can have effects which interfere greatly with detection.

In order to combat multi-user interference, several methods have been proposed. A review of this will be found in the article by Simon Moshavi entitled "Multi-user detection for DS-CDMA communications" which appeared in IEEE Communications Magazine, October 1996, pages 124–136. Amongst existing multi-user techniques, the techniques of subtractive elimination (Subtractive Interference Cancellation) have good performance for reasonable complexity in use. The general idea of this is simple: from a first detection at the output of an adapted filter, the contributions to the interference suffered by the other users is reconstructed by respreading. This interference is next subtracted from the signal received in order to supply a cleaned signal at a subsequent detection step. According to the way in which the subtraction is effected, this is known as parallel elimination (PIC, standing for Parallel Interference Cancellation) and serial elimination (SIC, standing for Serial Interference Cancellation) of the interference.

The parallel elimination method is illustrated in FIG. 2: the signal received is filtered by a battery of adapted filters ($200_1, 200_2, \ldots, 200_K$), each adapted filter relating to a given user. After detection ($210_k$), the estimated symbols are respread ($220_k$) spectrally by means of the signature of the user in question before being filtered by a filter modelling the transmission channel ($230_k$). There is thus available at the output of ($230_k$) an estimation of the contributory share of the signal received which can be attributed to the user k. From the signal received the sum of the contributory parts of the other users is subtracted (at ($240_k$)) in order to obtain a cleaned signal $S_k^{(1)}$. This cleaned signal can directly be the subject of detection after despreading or the elimination process can be iterated. The detection being of better quality at each iteration, there is then obtained, as the successive iterations continue, signals $S_k^{(i)}$ which are better and better rid of the multi-user interference.

The serial elimination method is illustrated in FIG. 3: the signals received by the different users are first of all ordered in decreasing order of power, that is to say 1, . . . , K. The procedure then consists of successive eliminations of the contributory shares, commencing with the signal with the highest power. For this purpose, the SIC detector has a series of stages in cascade, each eliminating the interference due to a particular user. The first stage works on the antenna signal and each subsequent stage receives as an input the output of the previous stage. Each stage has an adapted filter ($300_k$), a detector ($310_k$), a module ($320_k$) for respreading the symbols, a filter ($330_k$) modelling the transmission channel k and a subtracter ($340_k$) eliminating the contribution due to the user k. Each stage also supplies as an output of the detector ($310_k$) a decision on the received symbol, $\hat{S}_k$, and the interference elimination process ends at the $K^{th}$ stage.

Another serial elimination method is detection by Zero-Forcing Decision-Feedback (ZF-DF). According to this method, illustrated in FIG. 4, the signal received is filtered and recombined by a battery of adapted filters ($400_1, \ldots, 400_K$) before undergoing linear processing (405) consisting of a multiplication by the matrix $(F^T)^{-1}$ where F is the lower triangular matrix obtained by Cholesky decomposition of the correlation matrix R of the signatures of the different users ($R=F^T.F$). The matrix processing has the effect of partially decorrelating the signals of the different users. The signals thus partially decorrelated are then subjected to a serial elimination, after having been classified in decreasing order of amplitude, that is to say $A_1, \ldots, A_K$. The detector has a plurality of stages, each stage i comprising a detector ($410_i$) whose output is multiplied by multipliers ($415_{i,i+1}$), ..., ($415_{i,K}$) in order to supply products $A_i.F_{k,i}$ with i<k, where $F_{k,i}$ is an element of the matrix F. At the input to each stage (k), there is subtracted ($416_{i,k}$) the sum $$\sum_{i=1}^{k-1} A_i \cdot F_{k,i} \cdot \hat{s}_i$$

where $\hat{s}_i$ is the estimated symbol for the user i, that is to say the sum of the contributions of the previous users i<k. The decision ($410_k$) relating to the symbol transmitted by the user k is taken from the signal thus cleaned. The estimated symbols $\hat{s}_k$ of the different users are obtained by progressing from stage to stage.

The techniques set out above can be applied well to the simple situation where the transmission channel of a user has a single path. In this case, the filter modelling the channel can be limited to multiplication by a complex coefficient. When the channels are multi-path, the situation is on the other hand much more complex since it is necessary at the same time to eliminate multi-path interference and multi-user interference. An iterative detector with subtractive elimination of multi-user interference in the presence of multi-paths was proposed in an article by M. C. Reed et al. entitled "Iterative Multiuser detection using antenna arrays and FEC on multipath channels" published in the IEEE journal on Selected Areas in Communications, Vol. 17, N° 12, December 1999, pages 2082–2089. Each iteration of the detection comprises an adapted filtering, a formation of channels and a combination of the rake type. The method proposed presupposes however that the coefficients of attenuation, the phase rotations and the directions of arrival of all the paths of all the users are determined. This determination can be effected for example by correlating the pilot symbols emitted by the different users in adapted filters. However, this determination is often imprecise, which results in an imperfect or even erroneous elimination of the multi-user interference.

SUMMARY OF THE INVENTION

One aim of the present invention is to propose a detection method and device which improve the elimination of the multi-user interference in the presence of multi-path channels. A subsidiary aim of the present invention is the simple and precise determination of the attenuation coefficients and the phase rotations relating to the paths of the transmission channels of the different users.

The invention is defined by a multi-user detection method with elimination of interference between users, each user transmitting modulated data in the form of symbols on a transmission channel, each transmission channel (k) comprising at least one propagation path (p) and each propagation path arriving at an array of reception antennae (l) in a direction of arrival $\theta_{p,k}$, the method comprising at least one sequence of steps for each user, each sequence itself comprising:

(a) a step of estimating the signal transmitted by the user from the antennae signals, the said step effecting an estimation of the direction of arrival ($\theta_{p,k}$) and characteristics ($\alpha_{p,k}$, $\nu_{p,k}$) of propagation of each path (p) of the transmission channel (k) from the said signals;

(b) a step of estimating the data transmitted by the user from the said estimation of the signal transmitted;

(c) a step of estimating the contribution of the user to the signals received by the different antennae from the data estimated at step (b) and the direction of arrival as well as the propagation characteristics estimated at step (a);

(d) an interference elimination step subtracting from the antennae signals the contribution estimated at step (c) in order to obtain cleaned antennae signals; the cleaned antennae signals supplied by at least a first sequence being used as antennae signals by at least a second sequence.

According to a first embodiment, for a given user k, the interference is eliminated by subtracting from the antennae signals the contributions of all the other users.

According to a second embodiment, the users are classified by order of power received and the interference is eliminated by subtracting one after the other the contributions of the different users commencing with the users with the highest powers received.

Advantageously, for each user k, the said sequence comprises, after the step of estimating the said data, a step of deinterleaving followed by a step of channel decoding and channel coding and a step of interleaving the said data.

According to one characteristic of the invention, for each user k, the said sequence comprises, prior to the step of estimating the contribution of the user to the received signals, a step of modulation and spectral respreading by means of the signal which was used to spectrally spread the symbols of the said user.

According to one embodiment of the invention, the estimations of the transmitted signals of the users being considered to be an estimations vector with K components where K is the number of users, the said vector is subjected to a transverse matrix filtering before the decision step.

According to one variant of this embodiment, the estimated and remodulated data of the users being considered to be a vector of symbols with K components, the said symbols vector is subjected to a postcursor matrix filtering and the output of this filtering is subtracted, vector by vector, from the output of the transverse matrix filtering.

Alternatively, the symbols issuing from the modulation step being considered to be a symbols vector with K components, the said symbols vector is subjected to a postcursor matrix filtering and the output of this filtering is subtracted, vector by vector, from the output of the transverse matrix filtering.

According to an example embodiment of the invention, the estimations of the signals transmitted by the different users are subjected to a matrix multiplication by a matrix $(F^T)^{-1}$ before the data estimation step, where $F^T$ is the transpose of the lower triangular matrix F obtained by Cholesky decomposition of the signature correlation matrix which was used to spectrally spread the symbols of the said users, the interference being eliminated, for a given user k, in a first phase, by subtracting from the $k^{th}$ component of the matrix product the sum $$\sum_{i=1}^{k-1} A_i \cdot F_{k,i} \cdot \hat{s}_i$$

where $A_i$ is the amplitude of the signal transmitted by the user i, $\hat{s}_i$ is the symbol obtained by remodulation of the estimated data of the user i and $F_{k,i}$ the (k,i)th element of the matrix F, the estimation of the data transmitted by the user k being effected from the $k^{th}$ component after the said subtraction and, in a second phase, by subtracting, from the signals received by the different antennae, the sum of the contributions of all the other users.

Advantageously, for each user k, the step of estimating the signal transmitted by the user, on the transmission channel (k), comprises a formation of channels in the directions of arrival of the different propagation paths (p) of the said channel.

In addition, the channel formation for a propagation path of a transmission channel can place zeros in the directions of arrival of the other propagation paths of the same transmission channel.

The channel formation ($520_{p,k}$) for a propagation path (p) of a transmission channel (k) can also place zeros in the directions of arrival of all the propagations paths of the other transmission channels.

Advantageously, for each transmission channel (k), the results of formation of channels are weighted ($540_{1,k}, \ldots, 540_{P,k}$) by complex coefficients and then summed, the said coefficients being obtained from the estimated propagation characteristics ($\alpha_{p,k}, \hat{v}_{p,k}$) of the different paths (p) of the transmission channel (k).

According to one characteristic of the invention, for each user k, the directions of arrival and the propagation characteristics of the different paths are estimated from the a priori knowledge of a symbol transmitted by the said user.

According to an important embodiment of the invention, the multi-user detection method comprises the iteration of a set of sequences, each sequence of a user of the second iteration and the following iterations operating on the set of antennae signals where the contributions of the other users have been eliminated at the previous iteration.

Advantageously, at the first iteration, for each user, the directions of arrival and the propagation characteristics of the different paths are estimated from the a priori knowledge of at least one pilot symbol transmitted by the said user and, at the subsequent iterations, this estimation is effected from at least one data item estimated and remodulated at a previous iteration in addition to the said pilot symbol.

In addition, if the propagation characteristics of the different paths are known a priori, the first iteration can operate with channel formation, in omni-directional mode, the channel formation being applied as from the second iteration.

The invention is also defined by a multi-user detection device comprising means adapted to implement the method disclosed above.

The characteristics of the invention mentioned above, as well as others, will emerge more clearly from a reading of the description given in relation to the accompanying Figures, amongst which:

DESCRIPTION OF EXEMPLARY EMBODIMENTS

The general idea at the basis of the invention is to fit into a multi-user detection process the estimation of the complex coefficients (including attenuation and phase rotation) and the directions of arrival of the propagation paths. Thus the interference rejection process benefits from better precision of the estimation of the respective contributions of the different users in the signal received. Conversely, the process of estimating the complex coefficients benefits from the rejection of the multi-user interference by operating on cleaned signals.

Figure 1:
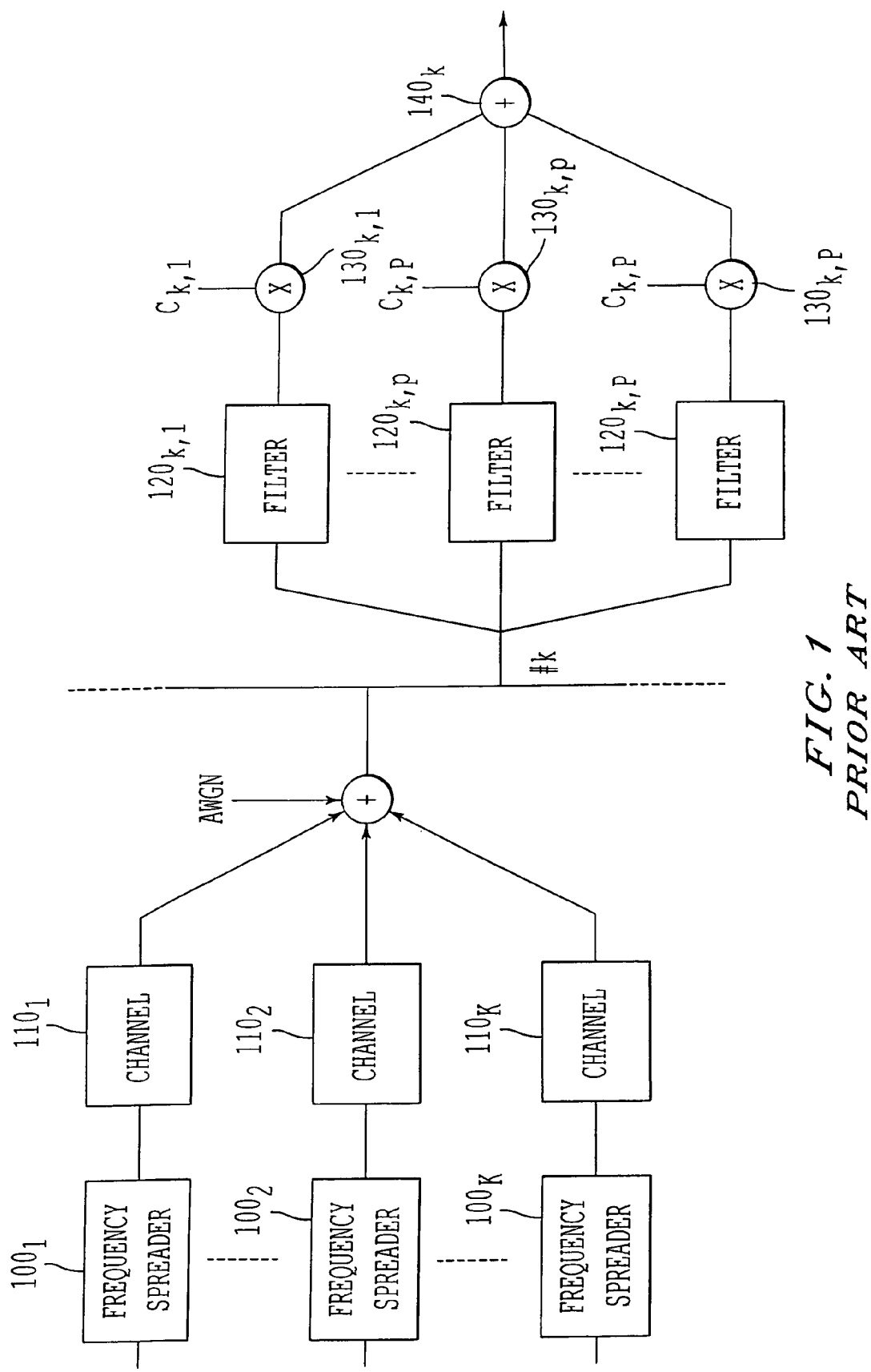
FIG. 1 depicts schematically a DS-CDMA telecommunications system.
Figure 2:
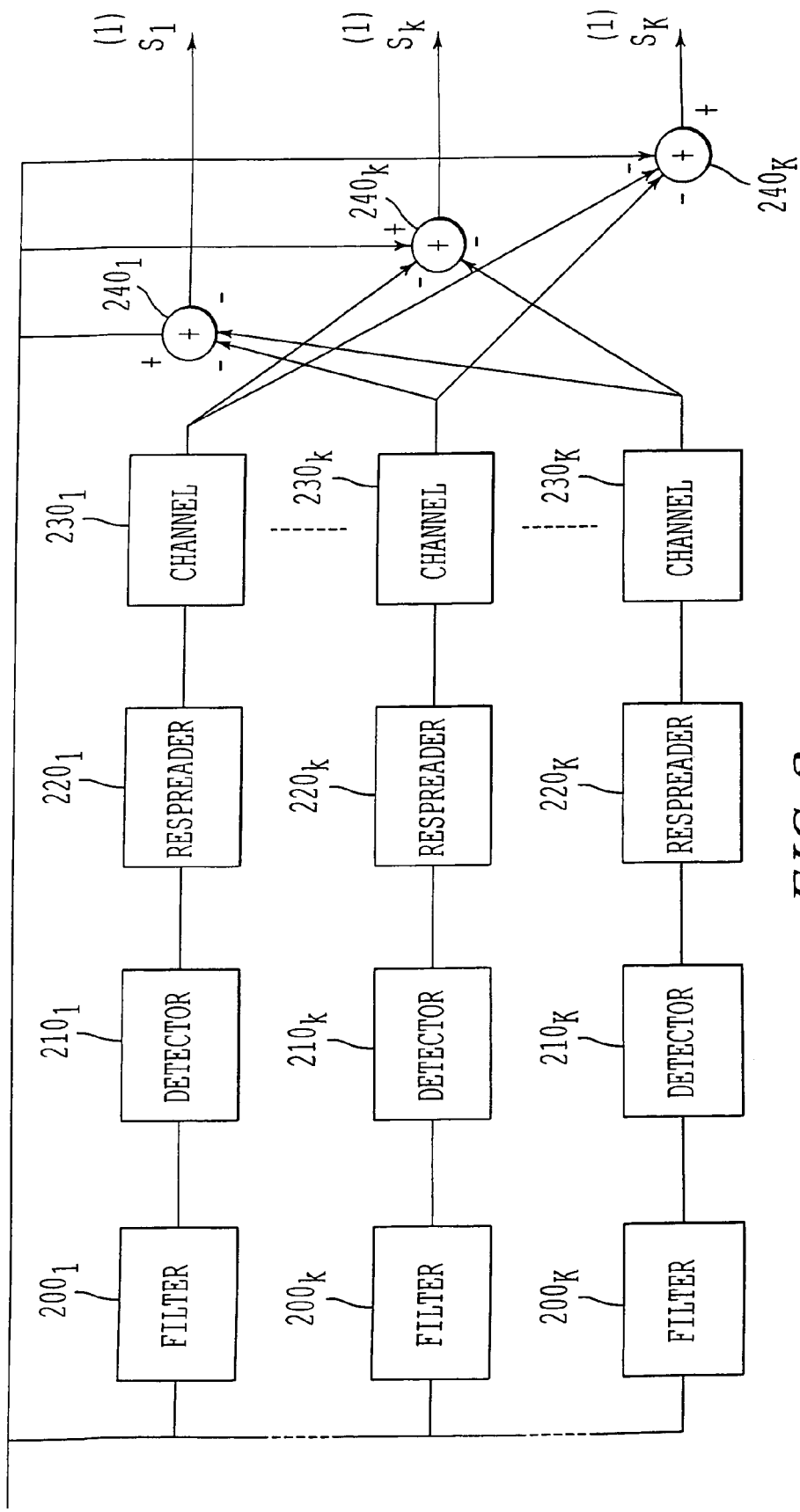
FIG. 2 depicts schematically a multi-user detection device of the PIC type.
Figure 3:
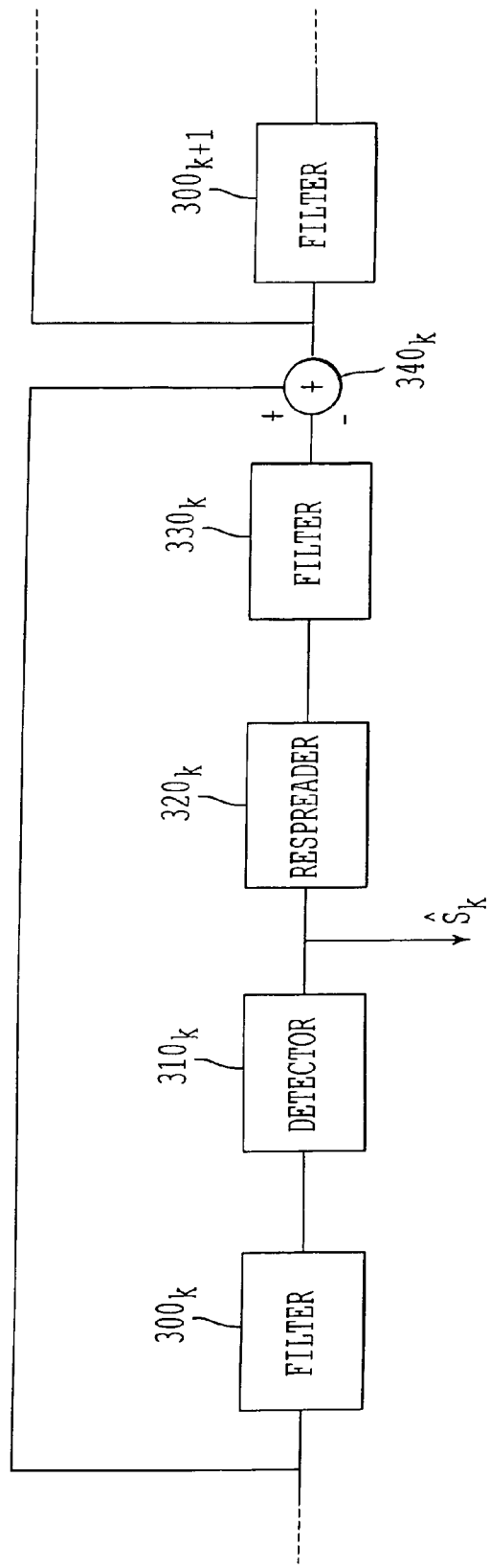
FIG. 3 depicts schematically a multi-user detection device of the SIC type.
Figure 4:
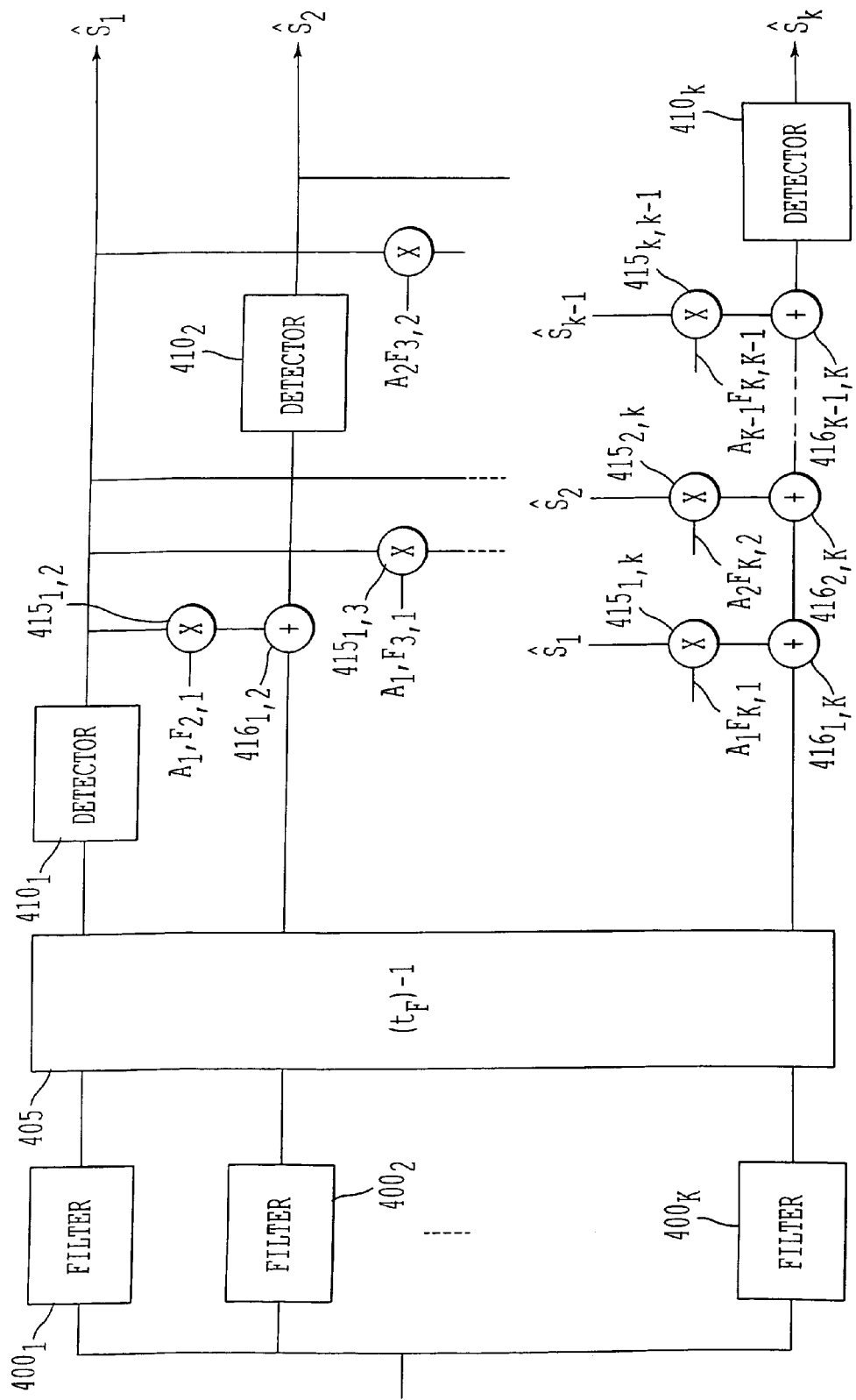
FIG. 4 depicts schematically a multi-user detection device of the ZF-DF type.
Figure 5:
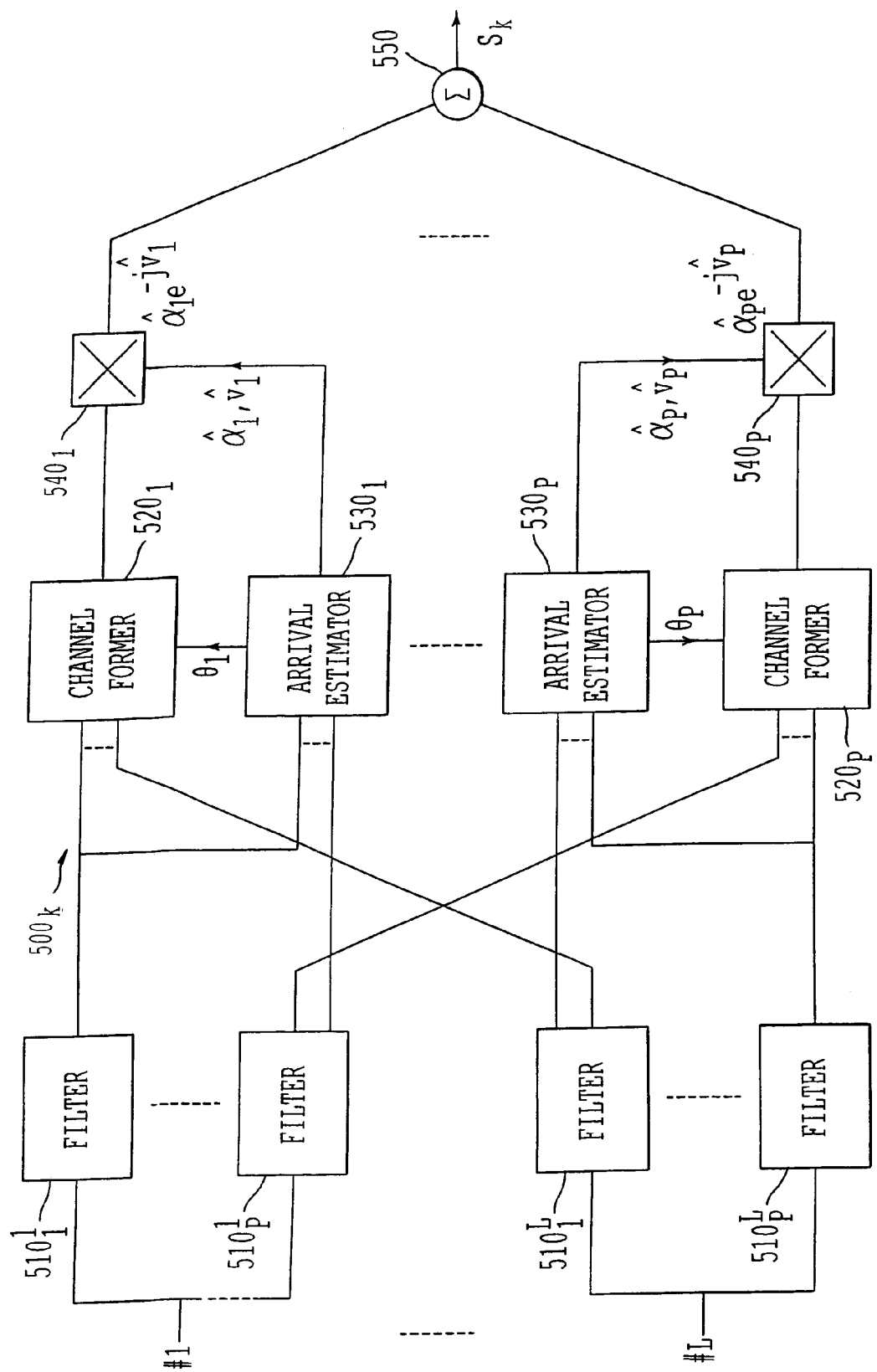
FIG. 5 depicts a receiver of the rake type useful to the device according to the invention.

The device according to the invention uses a receiver of the rake type illustrated in FIG. 5. Its particularity compared with a conventional rake receiver is to include a beam formation in the directions of arrival of the different paths. The device according to the invention has one receiver of this type per user, only one receiver ($500_k$) being illustrated in FIG. 5. For reasons of simplicity of notation, the different elements of the receiver ($500_k$) do not have the index k. The receiver ($500_k$) receives the outputs of the antennae 1, ..., L of an array of antennae, preferably linear and uniform, although other types of array can also be envisaged, notably circular arrays. The antennae signals are filtered by a filtering adapted to the signature of the user k in order to despread its contribution to the signal received. More precisely, each antenna output signal is despread in a battery of adapted filters ($510_1', \ldots, 510_P'$ where P is the number of paths and l=1 ... L is the index of the antenna) supplying as an output the signals relating to the different paths of the transmission channel of the user k. The signals corresponding to the same path p=1 ... P are directed to channel formation means ($520_1, \ldots, 520_P$) and to channel and direction of arrival estimators ($530_1, \ldots, 530_P$).

An explanation will first of all be given of the function of the estimators ($530_p$), p=1 ... P.

If the contribution received by the antenna 1, l=(1, ..., L) attributable to a path p=1 ... P of the channel k=1 ... K is denoted $X_{l,p,k}$, it is possible to write:

$$X_{l,p,k}(t) = \alpha_{p,k}(t) \cdot e^{i\xi_{l,p,k}} b_k(t) + n_{l,p,k}(t)$$

with $$\xi_{l,p,k}(t) = v_{p,k}(t) + (l-1) \cdot \varphi_{p,k}(t) = v_{p,k}(t) + 2\pi \frac{d}{\lambda}(l-1)\cos(\theta_{p,k}(t))$$

where $b_k(t)$ is the symbol transmitted by the user k, $n_{l,p,k}(t)$ is the assumed white additive Gaussian noise at the antenna l from the path p of the user k, including the thermal noise, the multi-path interference and the multi-user interference, d is the pitch of the array and $\lambda$ is the wavelength.

The propagation along the path p of a user k is thus modelled by an attenuation coefficient $\alpha_{p,k}(t)$ and a phase rotation $v_{p,k}(t)$. The total phase difference $\xi_{l,p,k}(t)$ results on the one hand from the phase rotation $v_{p,k}(t)$ caused by the path p and on the other hand by the difference in working between the antenna l and the reference antenna 1 at the angle of arrival $\theta_{p,k}(t)$.

The function of the estimator (530$_p$) is to estimate on the one hand the attenuation coefficient $\alpha_{p,k}$ and the phase rotation $v_{p,k}$ and on the other hand the angle of arrival $\theta_{p,k}$. The estimator will preferably effect a conjoint channel and direction of arrival estimation in accordance with the method disclosed in the French patent application No. 0011160, filed on Aug. 29, 2001 corresponding to U.S. patent application Ser. No. 09/919,917 filed on Aug. 2, 2001, entitled "Conjoint channel and direction of arrival estimation method" filed on the same date by the applicant. The content of this application is included here by reference. The said conjoint estimation method consists of seeking the values $\theta_{p,k}$, $\alpha_{p,k}$ and $v_{p,k}$ such that the quadratic distance $D_{p,k}$ is at a minimum.

$$D_{p,k} = \sum_{t=1}^{T} \sum_{l=1}^{L} |x_{l,p,k}(t) - \alpha \cdot e^{j\xi_{l,p,k}} \cdot b_k(t)|^2$$

The estimation is effected in three steps:

Step 1: $\xi_{l,p,k}$ is estimated by minimising the quadratic distance $D_{l,p,k}$ at each antenna:

$$D_{l,p,k} = \sum_{t=1}^{T} |x_{l,p,k}(t) - \alpha \cdot e^{j\xi_{l,p,k}} \cdot b_k(t)|^2$$

Step 2: $\theta_{p,k}$ and $v_{p,k}$ are estimated from a linear regression on the estimated values $\hat{\xi}_{l,p,k}$;

Step 3: from the estimated values $\hat{v}_{p,k}$ and $\hat{\theta}_{p,k}$, finally $\alpha_{p,k}$ is estimated by minimising the quadratic distance $$D_{p,k} = \sum_{l=1}^{L} D_{l,p,k}.$$

Thus an estimated value $\hat{\alpha}_{p,k}$ is obtained.

The estimation is effected in parallel for all the paths p of the users k. The estimated value $\hat{\theta}_{p,k}$ is supplied to the channel former (520$_p$) so that it points its reception beam in the direction of arrival of the path p. The channel formation is conventional and will therefore not be described any further. In a variant embodiment, not shown, each channel former (520$_p$) also receives the estimated values $\hat{\theta}_{p',k}$ supplied by the other estimators (530$_{p'}$), p'≠p, paths p' of the same user. This enables the channel former (520$_p$) to place zeros in the reception diagram for the directions concerned ($\hat{\theta}_{p,k}$, p'≠p) so as to better to separate the signals received from the different paths. In a variant which is also not shown, each channel former (520$_p$) of a user k receives the estimated values $\hat{\theta}_{p',k}$(k'≠k) of all the directions of arrival of the other users so as also to be able to place zeros in these directions.

The estimated values $\hat{\alpha}_{p,k}$ and $\hat{v}_{p,k}$ are transmitted to a complex multiplier (540$_p$) which multiplies the output signal of the channel former (530$_p$) by the complex coefficient $\hat{\alpha}_{p,k} \cdot e^{-j\hat{v}_{p,k}}$. The outputs of the P multipliers are then summed in an adder (550) in order to supply an output of the MRC (Maximum Ratio Combining) type. The operation performed by the receiver (500$_k$) is then an adapted filtering. If instead of the adding, a simple maximum of the values output from the different branches is calculated, the expression "adapted filtering" is no longer appropriate (it is no longer a filtering). Nevertheless, the receiver (500$_k$), will hereinafter be referred to as a receiver "of the rake type" whatever the type of processing output from the branches. In all cases, the output signal $S_k$ represents an estimation of the contribution of the user k to the signal received by the array.

Figure 6:
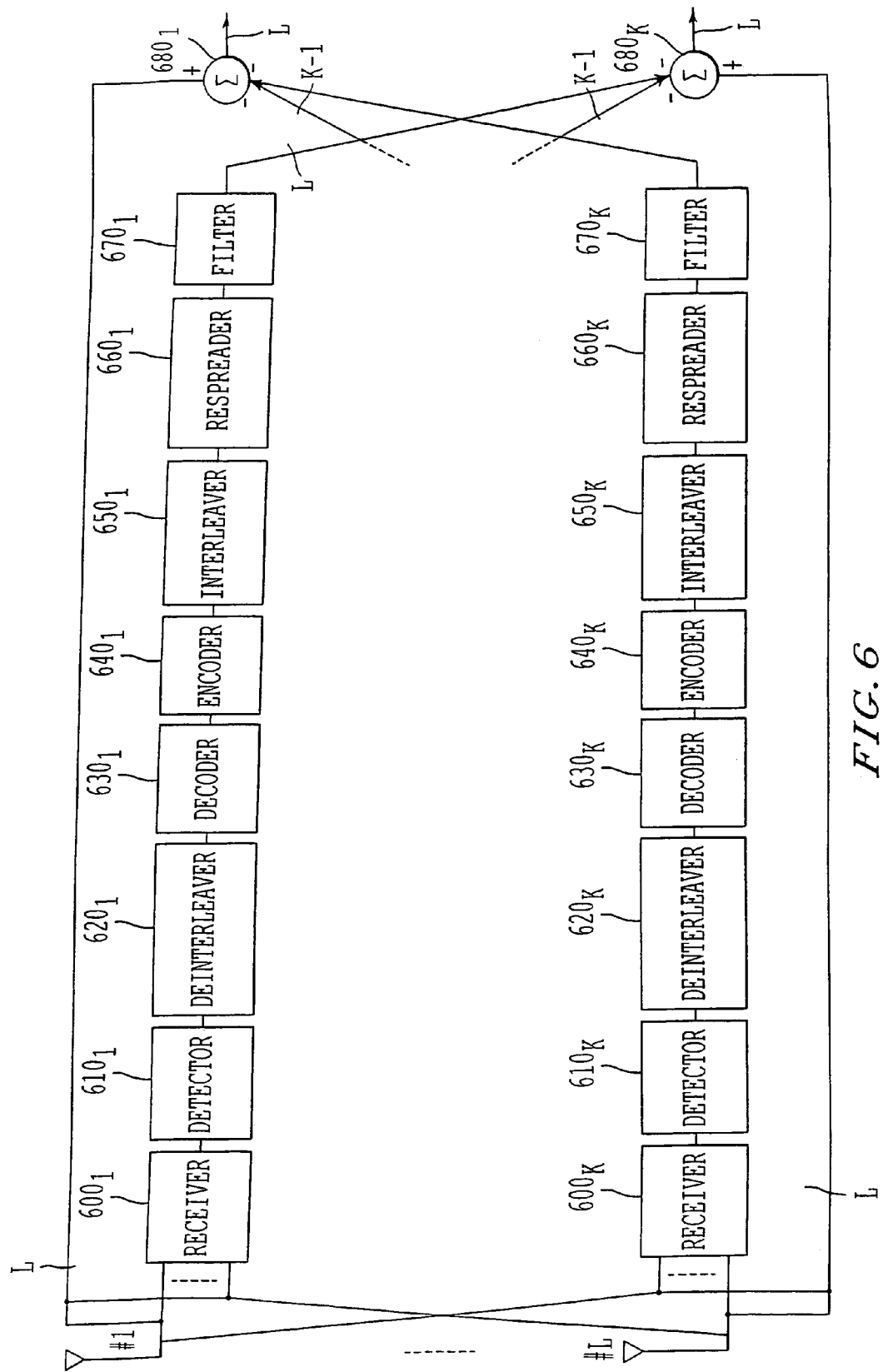
FIG. 6 depicts a multi-user detection device according to a first embodiment of the invention.

FIG. 6 depicts a multi-user detection device according to a first example embodiment of the invention. The multi-user interference is eliminated therein according to a parallel mode.

The outputs of the antennae 1 . . . L in the array are all connected to a battery of receivers of the rake type (600$_1$, . . . , 600$_K$) whose structure was described in FIG. 5. The signals obtained at the output of the receivers are then subjected to a sequence of processing steps comprising: a soft or hard decision step by means of detectors (610$_1$, . . . , 610$_K$) supplying in soft or hard form the data transmitted by the different users, followed by a step (620$_1$, . . . , 620$_K$) of deinterleaving the data thus obtained, a channel decoding/encoding step (630$_1$, . . . , 630$_K$) and (640$_1$, . . . , 640$_K$) providing a more reliable estimation of the data transmitted. Advantageously, this operation is performed by means of Soft Input Soft Output (SISO) decoding. Re-encoding is not necessary if the encoded data are recovered directly at the decoding output. For example, if an algorithm of the SOVA (Soft Output Viterbi Algorithm) type is used at (630$_1$, . . . , 630$_K$) the encoded data can be recovered directly along the maximum likelihood path. The data thus estimated are next once again interleaved at (650$_k$) before being remodulated and the symbols spectrally respread at (660$_k$) by means of the signature of the user k. Naturally, if the decoding used is of the soft value type, the remodulation will also be "soft" in the sense that it will supply symbols resulting from the weighting of symbols of the constellation, weighted by their respective a posteriori possibilities. Each respread symbol $\hat{s}_k$ is then filtered by a filter (670$_k$) modelling the transmission channel k and taking into account the geometry of the array of antennae. More precisely, the filter (670$_k$) calculates the following expressions:

$$x_{l,k} = \sum_{p=1}^{P} \hat{S}k \cdot \alpha_{p,k} \cdot e^{j\xi_{l,p,k}} \text{ for } l = 1 \ldots L$$

where $\alpha_{p,k}$ and $\xi_{l,p,k}$ are the respective values of the coefficients of attenuation and the phase differences obtained by the conjoint estimation module of the receiver (600$_k$).

The L-tuplet $$\left(\sum_{k'\neq k} \chi_{l,k'}\right)$$

is then deducted at ($680_k$), for each user k, from the L-tuplet of signals (Xl) received by the L antennae, in order to eliminate the contribution due to the other users. Thus K L-tuplets of antennae signals with the multi-user interference partly removed are obtained. The elimination process can be reiterated by repeating the sequence ($600_k$) . . . ($670_k$) from these signals and deducting, at each end of iteration, from the signals (Xl) received by the antennae, the newly calculated contributions. Each sequence of a user of the second iteration and of the following iterations operates on a set (L-tuplet) of antennae signals where the contributions of the other users were eliminated at the previous iteration. The estimation of the symbols transmitted by the different users thus gains in reliability as the iterations continue.

It should be noted that the operations of deinterleaving, channel decoding/encoding, and interleaving are optional (the units ($620_k$, $630_k$, $640_k$, $650_k$ are then absent). The spectral respreading can be applied directly to the estimated symbol. However, the use of a channel decoding (with of course channel coding corresponding to the transmission) reduces the error rate and therefore improves the reliability of the estimation of the interference and, consequently, of the symbols transmitted.

In addition, having available decisions on the coded bits or, better still, reliabilities on the coded bits, it is possible to use these hard or soft values, after having remodulated them, as new pilot symbols for the following iteration. If there were initially available, for example, 40 pilot symbols distributed amongst 200 coded symbols, there are then available, as from the second iteration, 240 pilot symbols. The increased number of pilots improves the quality of the estimation still further.

Finally, if the characteristics of the channels are already known, that is to say if the values $\alpha_{p,k}$ and $\xi_{t,p,k}$ are known, it is possible to dispense with the use of the pilots for the estimation of the directions of arrival. This is because the first iteration can operate with an omni-directional antenna array diagram (that is to say without the formation of channels), in which calculating the $\hat{\theta}_{p,k}$ values is not necessary. Decoding values are then available for effecting this calculation as from the second iteration and applying a channel formation from these values.

Figure 7:
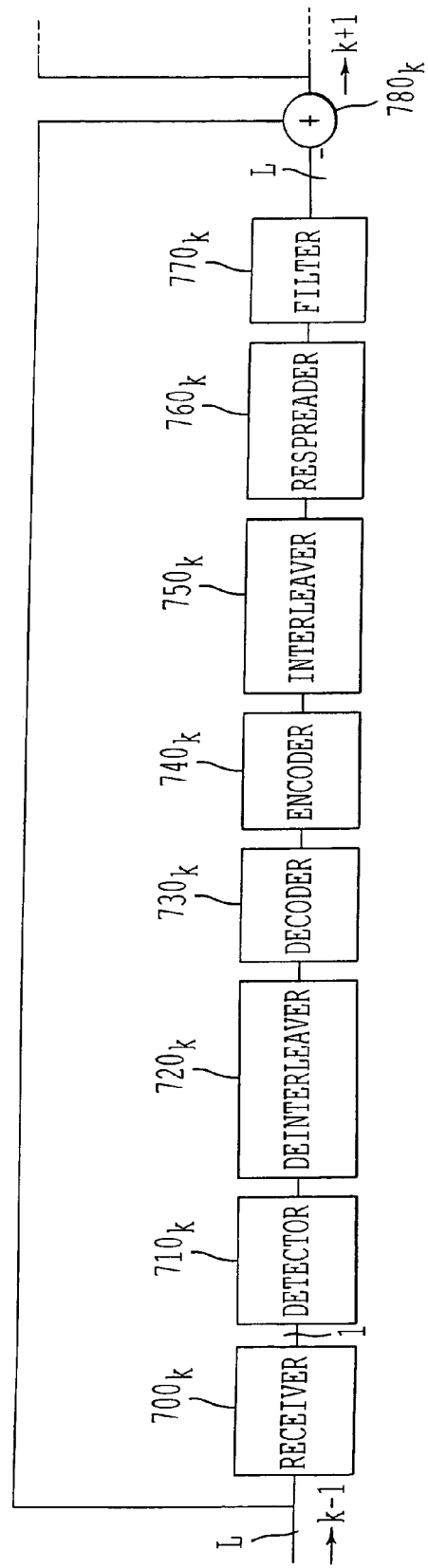
FIG. 7 depicts a multi-user detection device according to a second embodiment of the invention.

FIG. 7 illustrates a multi-user detection device according to a second example embodiment of the invention.

Unlike FIG. 6, the elimination of the interference is here effected in a series of K steps, K being the number of users. The contributions of the different users in the signals received are ordered by increasing order of power. For each user, the moduli squared of the outputs of the adapted filters of the user connected to the different antennae will for example be added and the sums obtained will be compared.

To simplify the diagram a simple stage has been depicted, each stage effecting one elimination step. Each stage has at an input a receiver of the rake type ($700_k$) as described in FIG. 5. The receiver of the first stage receives the L antennae signals and the receiver of a subsequent stage receives the L signals output from the previous stage. At the output of the receiver, there are effected, as already described to FIG. 6, a soft or hard decision ($710_k$), a deinterleaving ($720_k$), a channel decoding/re-encoding ($730_k$) and ($740_k$), an interleaving ($750_k$), a remodulation and a respreading ($760_k$) of the estimated symbols and then a channel filtering ($770_k$). The filters ($770_k$) are identical to the filters ($670_k$) already described. The L output signals of ($770_k$) are next subtracted at ($780_k$) from the L input signals of stage k in order to supply the L input signals of stage k+1. Thus the contributions of the different users are successively eliminated commencing with those which create the greatest interference. The outputs of the channel filters ($770_k$) of the different stages 1 . . . K can be used, like those of the channel filters ($670_k$) of FIG. 6, in order to regenerate, for each user k, its contribution to the antennae signals, in the form of an L-tuplet ($X_{l,k}$). The contributions of the different users are subtracted one by one by the adders ($780_k$) of the different stages.

It can be envisaged causing a serial elimination phase (FIG. 7) be followed by a parallel elimination phase (FIG. 6). More generally, the channels can be grouped together by "packets" corresponding to users in the same spatial region or with adjacent powers, the interferences between packets can be dealt with first of all, and then the interferences between users of the same packet next. The interpacket processing can be of a type (serial or parallel) distinct from the intrapacket one.

Figure 8:
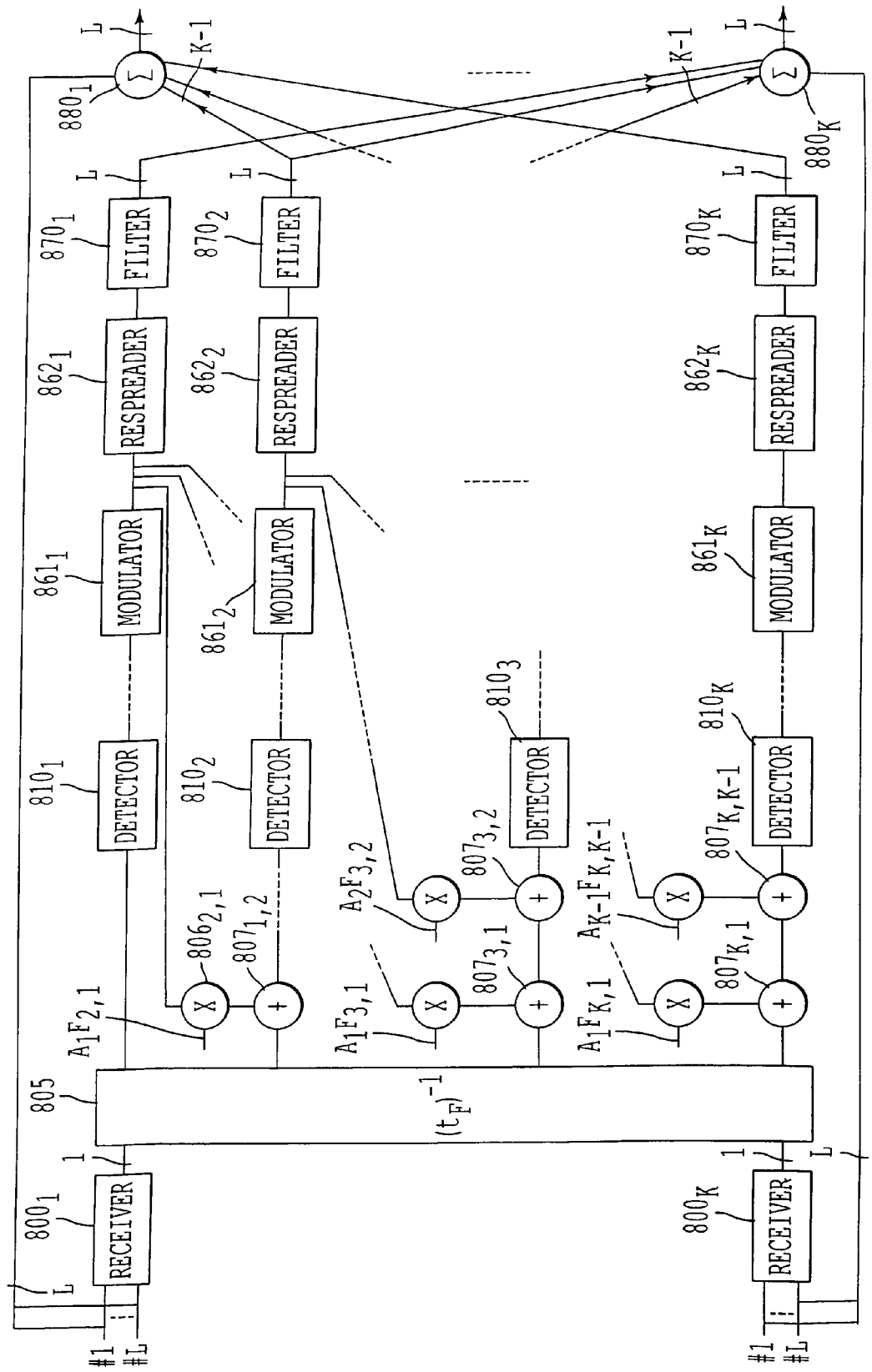
FIG. 8 depicts a multi-user detection device according to a third embodiment of the invention.

FIG. 8 depicts a multi-user detection device according to a third example embodiment of the invention.

This embodiment uses the ZF-DF elimination principle disclosed in the introduction. The outputs of the antennae 1 . . . L are connected to a battery of K receivers $800_l$ to $800_k$ of the rake type with the structure described in FIG. 5. The output signals of the receivers are subjected to a matrix-type multiplication ($805$) by the matrix $(F^T)^{-1}$ where F is the lower triangular matrix obtained by Cholesky decomposition of the correlation matrix R of the signatures of the different users ($R=F^T.F$). Each output line of the matrix multiplication comprises a series of modules ($810_k$) to ($870_k$) with the same functions as the corresponding modules ($710_k$) to ($770_k$). The module corresponding to $760_K$ has been depicted here in two parts, namely ($861_k$) for the modulation function and ($862_k$) for the spectral respreading function. The output signal of an interleaving module is subtracted at the respective inputs of the subsequent stages k', k'>k at ($807_{k',k}$), after multiplication at ($806_{k',k}$) by the coefficient $A_{k.}.F_{k,k'}$. The choice of the output of ($861_k$) rather than the output of ($810_k$) remodulated as in the conventional ZF-DF method makes it possible to advantageously profit from the channel decoding in order to refine the elimination of interference at the following stage. An L-tuplet ($\chi_{l,k}$) is obtained at the output of each channel filter ($870_k$). As in the parallel elimination method, for each user k, the L-tuplet $$\left(\sum_{k'\neq k} \chi_{l,k'}\right)$$

is deducted at ($880_k$), from each L-tuplet of antenna output signals (p), in order to eliminate the contribution due to the users other than k. An elimination of the serial type and an elimination of the parallel type are then carried out. As in the parallel elimination method, the process described can be iterated.

Figure 9A:
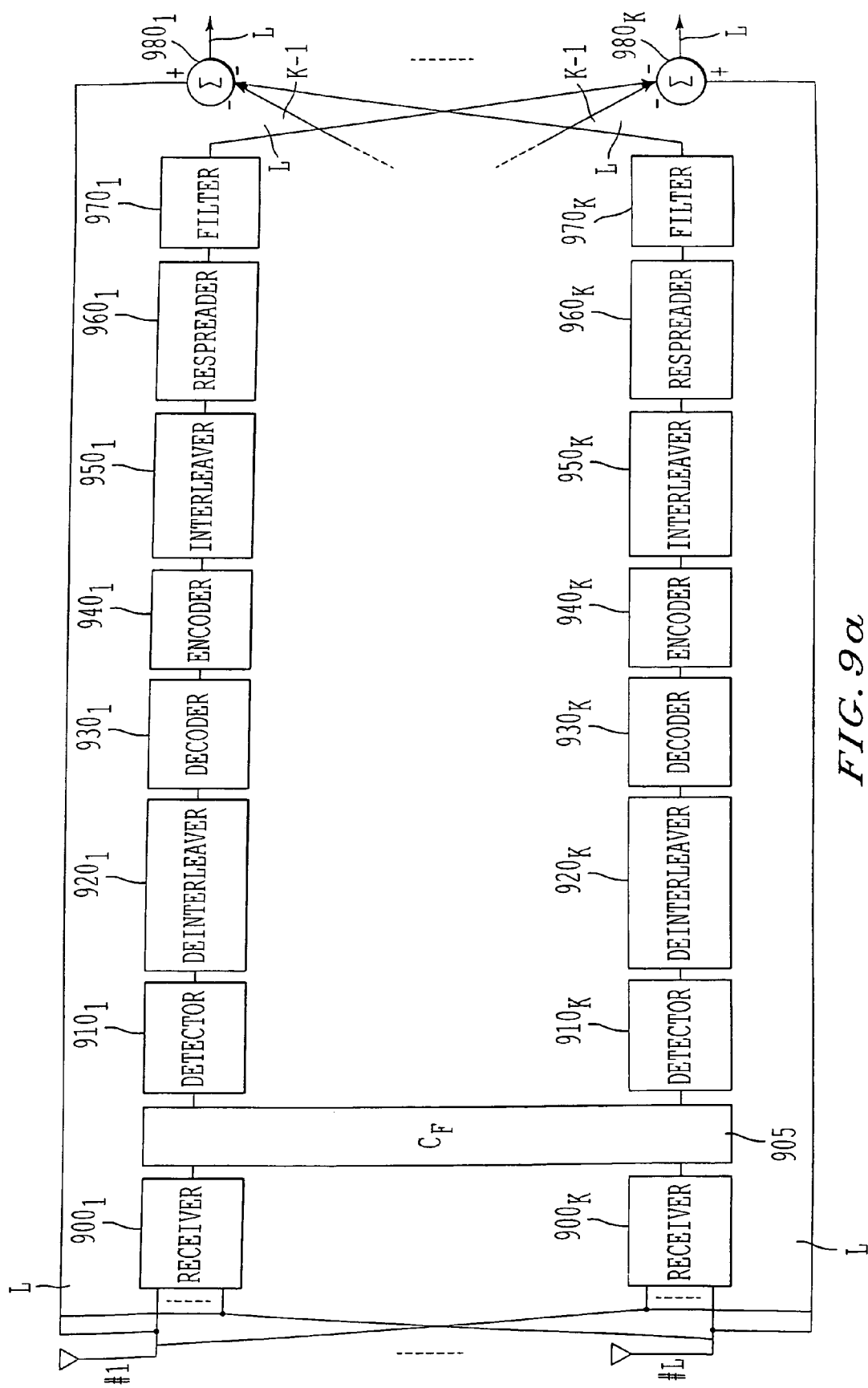
FIG. 9a depicts a multi-user detection device according to a fourth embodiment of the invention.

FIG. 9a depicts a multi-user detection device according to a fourth embodiment of the invention.

This embodiment extends the parallel elimination mode in the sense that it now includes a "multi-equalisation" function which will be explained later. The reference numbers indicated are equivalents to those of FIG. 6 when they correspond to identical functions. The device depicted in FIG. 9a nevertheless differs from that in FIG. 6 in that it comprises a linear filter (905) upstream of the decision modules (910$_k$). The purpose of this filtering is to take into account the outputs of the receivers of the rake type (900$_k$) at different sampling times in the elimination of the interference. The filter (905) is a transverse linear time filter which fulfils a role equivalent to that of a conventional transverse linear equaliser when a single user is considered. Unlike the latter, however, the filter (905) is a matrix filter which operates on vectors of size K and therefore uses matrices of size K×K instead of scalar coefficients, the number of such matrices corresponding to the number of time slots of the filter. The diagonal coefficients of the different matrices allow equalisation proper whilst the coefficients outside the diagonals make it possible to take into account the time responses of the different channels in the rejection of the interference between users. Just like its single-user homologue, the transverse filter (905) can be optimised by a known technique such as that of Zero Forcing (ZF) or Minimum Mean Square Error (MMSE).

Figure 9B:
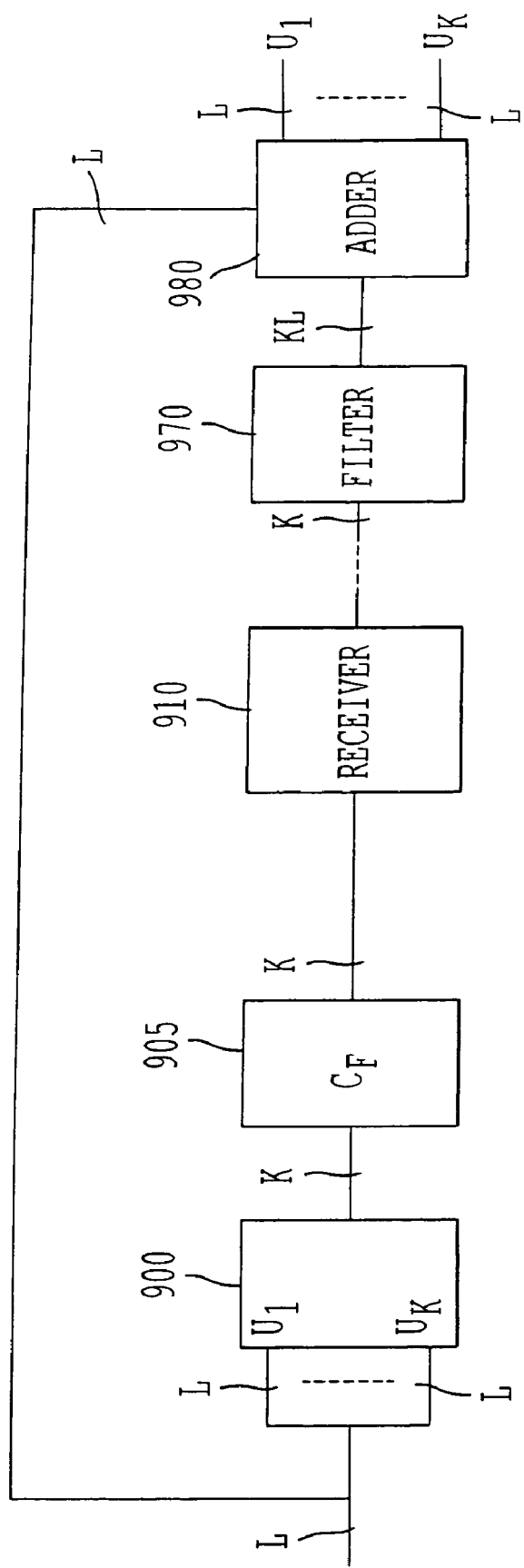
FIG. 9b depicts in an equivalent manner a multi-user detection device according to the fourth embodiment of the invention.

FIG. 9b depicts in an equivalent fashion the device of FIG. 9a, showing the vectorial processing character of the different modules (900) to (980), each module respectively integrating the modules (900$_1$, . . . , 900$_K$), . . . (980$_1$, . . . , 980$_K$) of FIG. 9a (for example, the module (900) is a battery of receivers of the rake type). The matrix filter (905) naturally remains unchanged.

Figure 10:
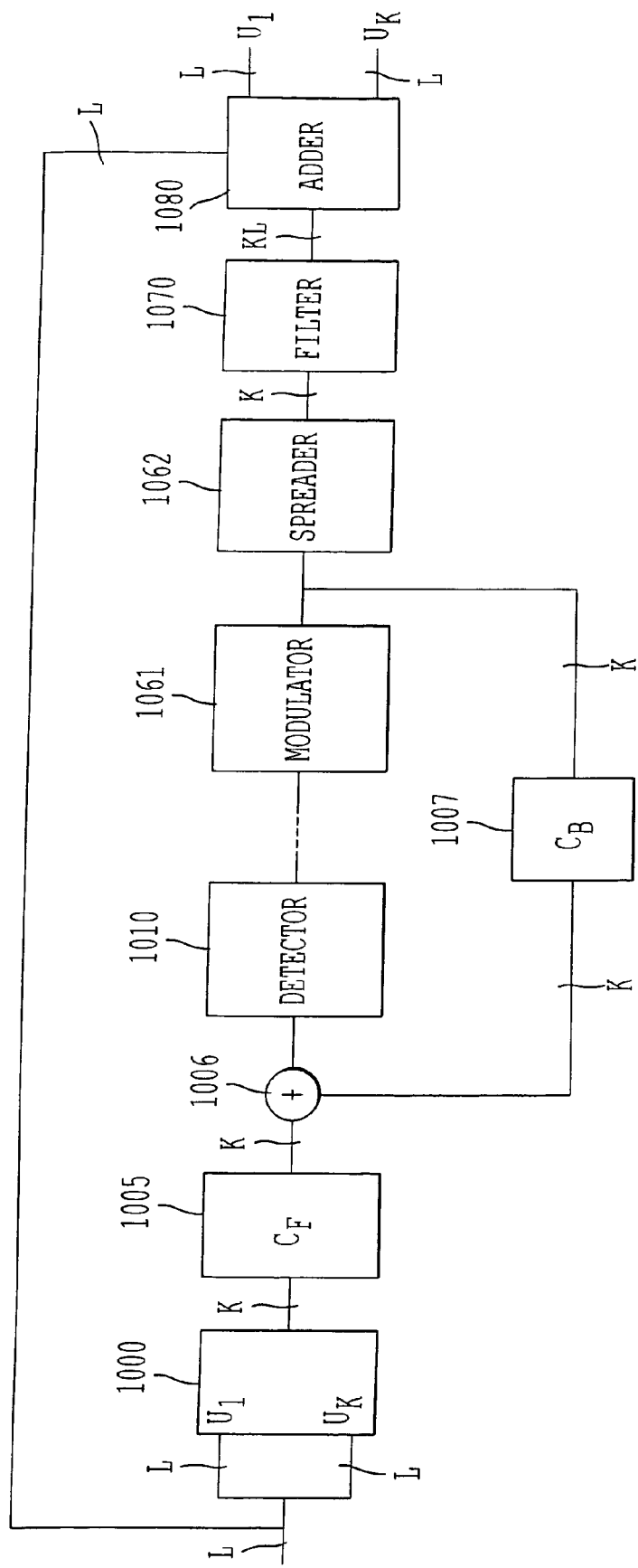
FIG. 10 depicts a multi-user detection device according to a fifth embodiment of the invention.

FIG. 10 depicts a multi-user detection device according to a fifth embodiment of the invention.

This embodiment transposes the technique of equalisation by decision feedback (DF) to the multi-user context. The modules (1000), (1010), . . . (1080) are modules identical to the modules (900), (910), . . . , (980) of FIG. 9, each module operating, as stated, on a vector with K components. The module corresponding to 960 has been depicted here in two parts (1061) and (1062) in order to separate the modulation function (1061) from the spectral spreading function (1062). The device comprises a precursor transverse filter (1005) identical to the filter (905) and a postcursor filter (1007) filtering the reinterleaved and remodulated output of the module (1061). The output of the postcursor filter (1007) is subtracted (at 1006) from the output of the precursor module (1005) and the result is provided as an input to the decision module (1010). The assembly consisting of the transverse filter (1005) and feedback filter (1007) can there also be optimised according to a known technique, ZF or MMSE for example. In the first case, this embodiment can be seen as a generalisation of the ZF-DF mode disclosed in FIG. 8.

The postcursor filter (1007) must be causal so as to ensure that the contribution of time samples not yet available at the time of the subtraction from the current sample has not been deducted. This can notably impose constraints on the length of the interleaving. Alternatively, the postcursor filter (1007) will filter the output of the remodulated decision module (1010), which will make it possible to relax the causality constraint at the cost nevertheless of abandoning the benefit of channel decoding in the evaluation of the intersymbol interference by the postcursor filter.

The embodiments illustrated in FIGS. 9 and 10 both use a "multi-equalisation" derived from the single-user equalisation symbol by symbol. It is however clear to a person skilled in the art that the invention is also capable of extension to the family of techniques of equalisation with symbol sequence estimation, namely MLSE (Maximum Likelihood Sequence Estimation), DDFSE (Delayed Decision Feedback Sequence Estimation), RSSE (Reduced State Sequence Estimation) etc. All these techniques are also transposable by means of the invention to the multi-user situation.

Although the invention has been essentially illustrated, for reasons of convenience, by means of modules executing certain functions, it is clear however that all or only some of these functions can be executed by a processor programmed for this purpose.

The invention claimed is:

1. A multi-user detection method that eliminates interference between users, each user transmitting a signal of modulated data in a form of symbols on a transmission channel, each transmission channel including at least one propagation path and each propagation path arriving at an array of reception antennas in a direction of arrival, the method comprising:

executing at least one sequence for each user, each sequence comprising:
(a) estimating the signal transmitted by the user from signals received at antennas, the estimating (a) effecting an estimation of a direction of arrival and characteristics of propagation of each path of the transmission channel from the signals;
(b) estimating the data transmitted by the user from the estimation of the signal transmitted;
(c) estimating a contribution of the user to the signals received by the different antennas from the data estimated at the estimating (b) and the direction of arrival and the propagation characteristics estimated at the estimating (a); and
(d) subtracting from the signals the contribution estimated at the estimating (c) to obtain cleaned antenna signals, the cleaned antenna signals supplied by at least a first sequence being used as antenna signals by at least a second sequence.

2. A multi-user detection method according to claim 1, wherein, for a given user, the interference is eliminated by subtracting from the antenna signals the contributions of all the other users.

3. A multi-user detection method according to claim 1, wherein the users are classified by order of power received and the interference is eliminated by subtracting one after the other the contributions of the different users commencing with the users with the highest powers received.

4. A multi-user detection method according to claim 1, wherein, for each user, the sequence comprises, after the estimating (b) the data, a deinterleaving followed by a channel decoding, a channel coding, and interleaving the data.

5. A multi-user detection method according to claim 1, wherein, for each user, the sequence comprises, prior to the estimating (c) the contribution of the user to the received signals, modulation and spectral respreading by the signal that was used to spectrally spread the symbols of the user.

6. A multi-user detection method according to claim 5, wherein, the estimating (a) of the transmitted signals of the users utilizes an estimation vector with K components, in which K is a number of users, the estimation vector being subjected to a transverse matrix filtering.

7. A multi-user detection method according to claim 6, wherein the estimated data transmitted by the users comprises a vector of symbols with K components, the vector of symbols being subjected to a postcursor matrix filtering and an output of this filtering is subtracted, vector by vector, from an output of the transverse matrix filtering.

8. A multi-user detection method according to claim 6, wherein the symbols issuing from the modulation are symbols vector with K components, the symbols vector being subjected to a postcursor matrix filtering, and an output of this filtering is subtracted, vector by vector, from an output of the transverse matrix filtering.

9. A multi-user detection method according to claim 4, wherein the estimating (a) the signals transmitted by the different users is subjected to a matrix multiplication by a matrix $(F^T)^{-1}$ before the data estimating (b), where $F^T$ is transpose of a lower triangular matrix F obtained by Cholesky decomposition of a signature correlation matrix that was used to spectrally spread the symbols of the users, the interference being eliminated, for a given user k, in a first phase, by subtracting from the $K^{th}$ component of the matrix product sum $$\sum_{i=1}^{k-1} Ai, Fk, i, \hat{S}i,$$

in which $A_i$ is amplitude of the signal transmitted by the user i, ŝi is the symbol obtained by remodulation of the estimated data of the user i, and $F_{k,i}$ is the (k,i)th element of the matrix F, the estimating (a) the data transmitted by the user k being effected from the $k^{th}$ component after the subtraction and, in a second phase, by subtracting, from the signals received by the different antennas, a sum of contributions of all the other users.

10. A multi-user detection method according to claim 1, wherein, for each user k, the estimating (a) the signal transmitted by the user, on the transmission channel, comprises forming channels in the directions of arrival of the different propagation paths.

11. A multi-user detection method according to claim 10 wherein the channel formation for a propagation path of a transmission channel places zeros in the directions of arrival of other propagation paths of the same transmission channel.

12. A multi-user detection method according to claim 11, wherein the channel formation for a propagation path of a transmission channel also places zeros in the directions of arrival of all the propagations paths of the other transmission channels.

13. A multi-user detection method according to claim 10, wherein, for each transmission channel, results of formation of channels are weighted by complex coefficients and are then summed, the coefficients being obtained from the estimated propagation characteristics of the different paths of the transmission channel.

14. A multi-user detection method according to claim 1, wherein, for each user, the directions of arrival and the propagation characteristics of the different paths are estimated from a priori knowledge of a symbol transmitted by the user.

15. A multi-user detection method according to claim 14, further comprising performing iterations of said executed at least one sequence a second iteration and following iterations operating on the set of antenna signals where the contributions of the other users have been eliminated at the previous iteration.

16. A multi-user detection method according to claim 15, wherein, at the first iteration, for each user, the directions of arrival and the propagation characteristics of the different paths are estimated from a priori knowledge of at least one pilot symbol transmitted by the user and, at subsequent iterations, the estimating is effected from at least one data item estimated and remodulated at a previous iteration in addition to the pilot symbol.

17. A multi-user detection method according to claim 15, wherein, the propagation characteristics of the different paths being known a priori, the first iteration operates without channel formation, in omni-directional mode, the channel formation being applied as from the second iteration.

* * * * *